United States Patent
Larnicol et al.

(10) Patent No.: US 10,428,401 B2
(45) Date of Patent: Oct. 1, 2019

(54) THERMAL TREATMENT PROCESS OF A STEEL SHEET AND DEVICE FOR ITS IMPLEMENTATION

(71) Applicant: ARCELORMITTAL, Luxembourg (LU)

(72) Inventors: Maiwenn Tifenn Soazig Larnicol, Saint-Marc (BE); Michel Roger Louis Bordignon, Sprimont (BE); Xavier Marc Jacques Edmond Robert Vanden Eynde, Braives (BE); Ana Isabel Farinha, Namur (BE); Pascal Gerkens, Baelen (BE); Jean-Francois Noville, Milmort (BE); Julien Christopher Michel Smal, Temploux (BE)

(73) Assignee: ArcelorMittal, Luxembourg (LU)

( * ) Notice: Subject to any disclaimer, the term of this patent is extended or adjusted under 35 U.S.C. 154(b) by 1091 days.

(21) Appl. No.: 14/766,332

(22) PCT Filed: Feb. 6, 2013

(86) PCT No.: PCT/IB2013/050979
§ 371 (c)(1),
(2) Date: Aug. 6, 2015

(87) PCT Pub. No.: WO2014/122499
PCT Pub. Date: Aug. 14, 2014

(65) Prior Publication Data
US 2015/0368743 A1    Dec. 24, 2015

(51) Int. Cl.
*C21D 1/63*    (2006.01)
*C21D 9/46*    (2006.01)
(Continued)

(52) U.S. Cl.
CPC ............. *C21D 9/46* (2013.01); *C21D 1/46* (2013.01); *C21D 1/607* (2013.01); *C21D 1/63* (2013.01); *Y02P 10/212* (2015.11)

(58) Field of Classification Search
CPC . C21D 1/46; C21D 1/607; C21D 1/43; C21D 9/46
See application file for complete search history.

(56) References Cited

U.S. PATENT DOCUMENTS

| 1,724,552 A | 8/1929 | Bellis |
| 3,158,515 A | 11/1964 | Michael |

(Continued)

FOREIGN PATENT DOCUMENTS

| DE | 2247269 A1 | 4/1973 |
| FR | 511106 | 12/1920 |

(Continued)

*Primary Examiner* — Lois L Zheng
(74) *Attorney, Agent, or Firm* — Davidson, Davidson & Kappel, LLC

(57) ABSTRACT

A thermal treatment process of a ferrous alloy sheet is provided. The process includes the step of performing a thermal treatment on said sheet when running, by immersing it into at least one molten oxides bath. The molten oxides bath has a viscosity lower than $3 \cdot 10^{-1}$ Pa·s, the surface of the bath is in contact with a non-oxidizing atmosphere and the molten oxides are inert towards iron. The difference between the temperature of the ferrous alloy sheet at the entry of the bath and the temperature of the bath is between 25° C. and 900° C. The residues of oxides remaining on the surfaces of the ferrous alloy sheet at the exit of the bath are eliminated. A device for implementing this process is also provided.

24 Claims, 2 Drawing Sheets

(51) Int. Cl.
  *C21D 1/46* (2006.01)
  *C21D 1/607* (2006.01)
  *C21D 1/00* (2006.01)

(56) References Cited

U.S. PATENT DOCUMENTS

| | | |
|---|---|---|
| 3,390,021 A | 6/1968 | Harold |
| 3,856,568 A | 12/1974 | Tanaka et al. |
| 4,473,412 A | 9/1984 | Maruhashi et al. |
| 7,556,865 B2 | 7/2009 | Drillet et al. |
| 9,163,305 B2 | 10/2015 | Takahashi et al. |

FOREIGN PATENT DOCUMENTS

| | | |
|---|---|---|
| FR | 2 524 004 | 9/1983 |
| GB | 2117374 | 10/1983 |
| JP | 58145306 A | 8/1983 |
| JP | S58164733 | 9/1983 |
| JP | S60145327 A | 7/1985 |
| JP | 2012012692 A | 1/2012 |
| RU | 2176285 C2 | 11/2001 |
| RU | 2363756 C2 | 10/2009 |
| SU | 1482961 A1 | 5/1989 |
| WO | 2012081719 | 6/2012 |

THERMAL TREATMENT PROCESS OF A STEEL SHEET AND DEVICE FOR ITS IMPLEMENTATION

The present invention relates to a thermal treatment method of a ferrous alloy sheet, and more particularly, of a steel sheet, and to a device designed for implementing such a method.

BACKGROUND

In order to improve their processability, cold-rolled steel sheets are heat-treated with a continuous annealing furnace having, in sequence, a heating zone, a soaking zone, first and second cooling zones, and, possibly an overageing zone, and through which the strip runs continuously.

The heating zone of the continuous annealing furnace can include a direct-fired annealing furnace or a radiant tube annealing furnace. These two types of annealing furnaces can be used alone or in combination to heat the strip up to its recrystallization temperature. However with a direct-fired annealing furnace or with a radiant tube annealing furnace, it is difficult to control the temperature of the strip and to insure a good homogeneity of its temperature all along the surface of the strip. Moreover, the use of these furnaces to heat the sheet can lead to the formation of oxides on the surfaces of the sheet, which must then be eliminated by additional pickling and/or shot blasting steps.

In order to solve these problems document FR-A-2 524 004 has disclosed a process for annealing a running steel strip in which said strip, instead of running through a furnace, runs through a molten glass bath kept at 950° C. or higher. The strip is then taken out of the molten glass bath with a coagulated glass coating formed on the surfaces of the strip, and then the strip is cooled down to a temperature lower than 400° C., preferably 300° C. or less, in order to destroy and peel off the glass coatings. The bath has a viscosity not exceeding 20 Pa·s as measured at 950° C. The cooling step is performed, for example, by projecting a gas, preferably an inert gas, or liquid water, onto the strip surface.

This method allows annealing the strip without surface oxidation, but it requires keeping the glass bath at a high temperature, and so requires a significant amount of energy. Moreover, at these high temperatures the molten glass composing the bath evaporates. The vapours are noxious, and they must be collected. Also, the bath must be regularly refilled, not only because the glass deposition onto the strip must be compensated, but also because the evaporation leads to a supplemental consumption.

This method also includes the formation of a glass coating on the surfaces of the strip which, as said before, implies additional steps of cooling of the strip at a temperature lower than 400° C., and of elimination of the glass coatings. These steps slow down the production of steel strips, and the cooling at a temperature lower than 400° C. implies that the running strip must be reheated if a galvanization is required in a following step of the treatment.

SUMMARY OF THE INVENTION

It is an object of the present invention to provide a method of continuous thermal treatment of a ferrous alloy sheet, and most particularly a steel sheet, which guarantees homogeneity of temperature all along the surfaces of the sheet, while reducing the global energy consumption and not slowing down the strip production.

The present invention provides a thermal treatment process of a ferrous alloy sheet comprising the step of performing a thermal treatment on said sheet when running, by immersing it into at least one molten oxides bath, wherein:

said molten oxides bath has a viscosity lower than $3 \cdot 10-1$ Pa·s, preferably lower than $2 \cdot 10-2$ Pa·s, the surface of said bath being in contact with a non-oxidizing atmosphere, and said molten oxides are inert towards iron, the difference between the temperature of said ferrous alloy sheet at the entry of the bath and the temperature of said bath is between 25° C. and 900° C., preferably between 50 and 250° C., and the residues of oxides remaining on the surfaces of said ferrous alloy sheet at the exit of said bath are eliminated.

In a first embodiment, the temperature of said ferrous alloy sheet at the entry of the bath is lower than the temperature of the bath, resulting in a heating of said ferrous alloy sheet.

Said ferrous alloy sheet may be pre-heated prior the immersion into said molten oxides bath, such preheating being possibly performed by any classical means or by dipping the sheet into another molten oxides bath at a lower temperature than said molten oxides bath.

The temperature of said molten oxides bath may be within the range 600° C. to 900° C., preferably between 700 and 850° C.

Said ferrous alloy sheet may be cooled after having been heated in said molten oxides bath.

The molten oxides bath may initially contain:
45% w≤$B_2O_3$≤90% w;
10% w≤$Li_2O$≤55% w;
0% w≤$Na_2O$≤10% w;

Na2O when present, being possibly, at least partially, replaced by at least one or several of CaO, K2O, SiO2, P2O5, Mn2O.

The molten oxides bath composition may be initially 45% w≤$B_2O_3$ ≤55% w and 40% w≤$LiO_2$≤50% w.

In another embodiment, the temperature of said ferrous alloy sheet at the entry of the bath may be higher than the temperature of the bath, resulting in a cooling of said steel sheet.

The temperature of said molten oxides bath may be comprised between 600° C. and 700° C.

The molten oxides bath may initially contain:
45% w≤$B_2O_3$≤70% w;
30% w≤$Li_2O$≤55% w;
10% w≤$Na_2O$≤20% w;

$Na_2O$ being possibly, at least partially, replaced by one or several of CaO, $K_2O$, $SiO_2$, $P_2O_5$, $MnO_2$.

Said cooling step of the ferrous alloy sheet after a heating step may be performed in said molten oxides bath.

The residues of molten oxides remaining on the surfaces of said ferrous alloy sheet may be eliminated by any suitable means such as, for example, mechanical devices (brushes, carbon felts, etc. . . . ) and/or gas blowing nozzles.

The ferrous alloy sheet may finally be submitted to a coating step.

The ferrous alloy sheet may be a steel sheet.

The subject of the invention is also a device for implementing said thermal treatment process, comprising a molten oxides bath having a viscosity lower than $3 \cdot 10-1$ Pa·s, preferably lower than $2 \cdot 10-2$ Pa·s, wherein:

the surface of said bath is in contact with a non-oxidizing atmosphere;

said molten oxides are inert towards iron;

and comprising means for eliminating the residues of molten oxides remaining on the surfaces of said ferrous alloy sheet at the exit of said bath.

It may comprise means for preheating the ferrous alloy sheet, located upstream the molten oxides bath.

It may comprise means for coating the ferrous alloy sheet, located downstream the molten oxides bath.

It may comprise means for cooling the ferrous alloy sheet, preferably located between the molten oxides bath and the coating means.

The means for eliminating the residues of molten oxides remaining on the surfaces of the ferrous alloy sheet at the exit of the bath may comprise brushes and/or gas blowing nozzles.

Basically, the invention differs from the process of FR-A-2 524 004 in that it requires a complete removal of the molten glass which may be present on the sheet after its exits the bath, particularly if the sheet then undergoes a coating process such as a galvanization, a galvannealing, an aluminization. An advantage of the process of the invention is also that the iron oxide layer which may exist at the steel sheet surface before it enters the bath is removed in the bath, and after its has left the bath, the sheet surface is ready for a coating step without further cleaning of the surface.

BRIEF DESCRIPTION OF THE DRAWINGS

The features and advantages of the present invention will become more clearly apparent from the following description, example and with reference to the appended figures in which:

As illustrated in FIG. 1, in a first embodiment of the invention, a cold rolled steel sheet 1 continuously runs through the different modules of the line, and is moved by a group of transport rolls 2.

DETAILED DESCRIPTION

Figure 1:
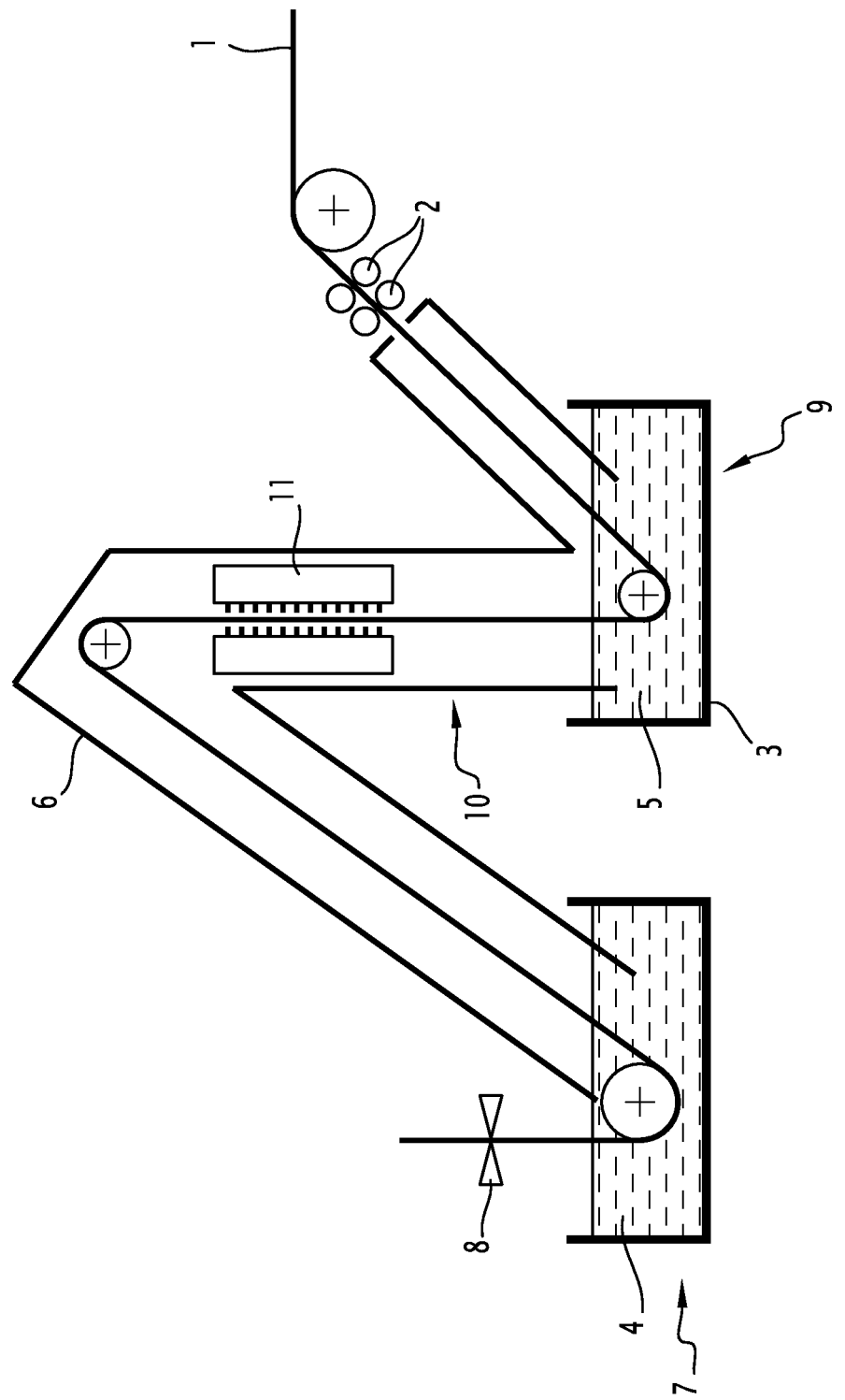
FIG. 1 is a schematic view of a continuous annealing line according to a first embodiment of the invention.

The steel sheet is first transported through an annealing module 9. This annealing module is composed of a vessel 3 containing a bath 5 of molten oxides which are inert towards iron. In other words, these oxides do not chemically react with the surface and the outermost regions of the sheet 1, contrary to what happens with an oxygen-containing atmosphere. The steel strip is preferably degreased before entering into the oxide bath, especially if the strip temperature is close to the room temperature when it enters into the oxide bath. The bath 5 has a temperature TB higher than the temperature TE of the steel sheet 1 when it enters the bath 5, and has a viscosity η at this temperature lower than 3·10−1 Pa·s, preferably lower than 2·10−2 Pa·s. The temperature of the bath TB is, for example, set between 600° C. and 900° C., preferably between 700 and 850° C. The bath is kept at said temperature TB by heating means (not shown) such as induction heating means, immersed burners or resistance heating means. The precise heating means which can be used may depend on the material used for making the vessel 3. The initial composition of the bath 5 is, for example, between 45% and 90% in weight of $B_2O_3$ (boundaries included, as for all the other contents), between 10% and 55% in weight of $Li_2O$, and optionally up to 10% of $Na_2O$. $Na_2O$ can be partially or totally replaced by one or several of $CaO$, $K_2O$, $SiO_2$, $P_2O_5$, $MnO_2$. It must be understood that the bath composition may vary during the operation of the device, since the bath unavoidably gets polluted by oxides like aluminium, silicon, manganese, chromium or iron oxides resulting from the oxidation of the strip surface. What is essential is that, during the operation of the device, these changes of composition do not lead to changes of the bath viscosity which would set this viscosity out of the required limits.

A preferred initial composition of the bath 5 is 45% w≤B2O3≤55% w and 40% w≤LiO2≤50% w, which surrounds the binary eutectic Li2O—B2O3, that is 53% w B2O3 and 47% w LiO2. A bath 5, the composition of which is close to an eutectic composition, allows to work at a lower temperature, and the bath behaviour is more easily predictable.

The maximum viscosity of the bath is 3·10−1 Pa·s, and preferably 2·10−2 Pa·s. The requirement of such a very low viscosity of the bath is all the more important, because it reduces the quantity of residues of glass which is being dragged on the sheet. Such glass residues are undesirable in the frame of the present invention and have to be removed.

The bath 5 is placed under a non-oxidizing atmosphere composed for example of N2 and H2 gases (for example N2+1% H2). The bath 5 can be stirred by stirring means (not shown) such as bubbling means or any other known stirring devices, so as to improve its temperature homogeneity.

The steel sheet 1 is immersed into said bath 5, and thanks to the specific viscosity value η of said bath 5, the steel sheet 1 is homogeneously heated up to a temperature TO, higher than TE, measured at the outlet of the bath 5. Since the bath 5 is placed under a non-oxidizing atmosphere and the molten oxides composing the bath are inert towards iron, the steel sheet 1 is not oxidized during the immersion, and a sheet surface descaling step, for example by pickling and/or shot-peening, is not required after the annealing.

The inventors have noticed that if the difference ΔT between the temperature of the steel sheet 1 as it enters the bath TE and the temperature of the bath TB is higher than 250° C., there is a risk that oxides of the bath solidify on the sheet 1 and form a film of oxides on the surfaces of the steel sheet 1 at its entry on the bath. This solidified oxide will however melt again provided that a sufficient stirring of the bath is being performed and/or that the line speed is being decreased to increase the dipping time of the steel sheet. Another way to limit or suppress this issue is to inject a flow of liquid oxide at high temperature (around 900° C.) on the steel sheet, when it enters into the bath. This can be done by installing a second molten oxide crucible, mainly aimed at reheating the oxide collected in the main crucible used for the thermal treatment of the steel sheet, before re-injecting it on the strip with a circulation pump. In other words, this second crucible is mainly a "heat exchanger". This second crucible can also be used to purify the liquid oxide from polluting elements like Mn, Al, Si, Cr.

In order to avoid these complications, the steel sheet 1 can be optionally first preheated for example in an induction furnace (not shown) before its immersion into the bath 3. So, ΔT can be lowered to a more surely satisfactory value (not more than 250° C.).

But it was also found that if the difference ΔT is lower than 25° C., the thermal exchange between the steel sheet 1 and the bath 5 is too low to heat or cool the steel sheet efficiently. More surely avoiding too low thermal exchanges is obtained with a ΔT of 50° C. at least So, ΔT must be kept between 25 and 900° C., possibly by a combined action on the sheet temperature as it enters the bath TE and on the bath temperature TB. The preferred ΔT range is 50-250° C. Defining a more precise ΔT range which would be valid for every embodiment of the invention is not possible. In particular for the low strip temperatures, the optimal ΔT value depends on the strip thickness, of the strip running speed, of the intensity of the bath stirring. Concerning the upper limit of the bath temperature which is a parameter of the upper limit of the ΔT range, it is determined by the acceptable evaporation rate of the oxide bath and the mechanical resistance of the vessel 3 at high temperatures.

After the annealing module 9, the steel sheet 1 runs through a cleaning module 10, in which the residual molten oxides remaining on the steel sheet surfaces are eliminated. These residual molten oxides can be easily and quickly removed from the surfaces thanks to the value of specific viscosity η of the bath 5, and this step does not slow down the production. Said cleaning module can include one or several of gas nozzles 11, brushes, or any other means allowing the removal of the remaining molten or solidified oxides of the surfaces of the steel sheet 1. If the oxides are removed by gas blowing, the gas are preferably hot (550° C. at least) to avoid a solidification of the glass droplets which would make them impossible to remove by gas blowing. If the glass droplets are already solidified, a brushing performed at a high temperature (470-600° C.) is optimal.

The steel sheet 1, then, runs through a coating module 7, such as a galvanization module where the steel sheet 1 is immersed into a bath 4 of molten zinc or zinc alloy, as is classically known. If the temperature TS of the steel sheet 1 as it enters the galvanization bath 4 is too high to guarantee a good adhesion of the zinc coating or to avoid coating evaporation, the steel sheet 1 can optionally run through a cooling module (not shown) placed before the coating module 7. This cooling module can include, for example, nozzles projecting water or gas on the steel sheet 1, or can be a cooling module such as described in the second embodiment of the invention. After its exit from the galvanization bath 4, the sheet 1, as it is known in the art, is treated by a wiping device 8 (such as a gas blowing device) which allows regulating the thickness of the coating layer.

From its entrance into the vessel 3 containing the oxides bath 5 to its exit from the galvanization bath 4, the steel sheet 1 can be placed under a non-oxidizing atmosphere by means of one or several snouts 6 in which a neutral (N2) or reductive (N2-H2) atmosphere is kept.

Figure 2:
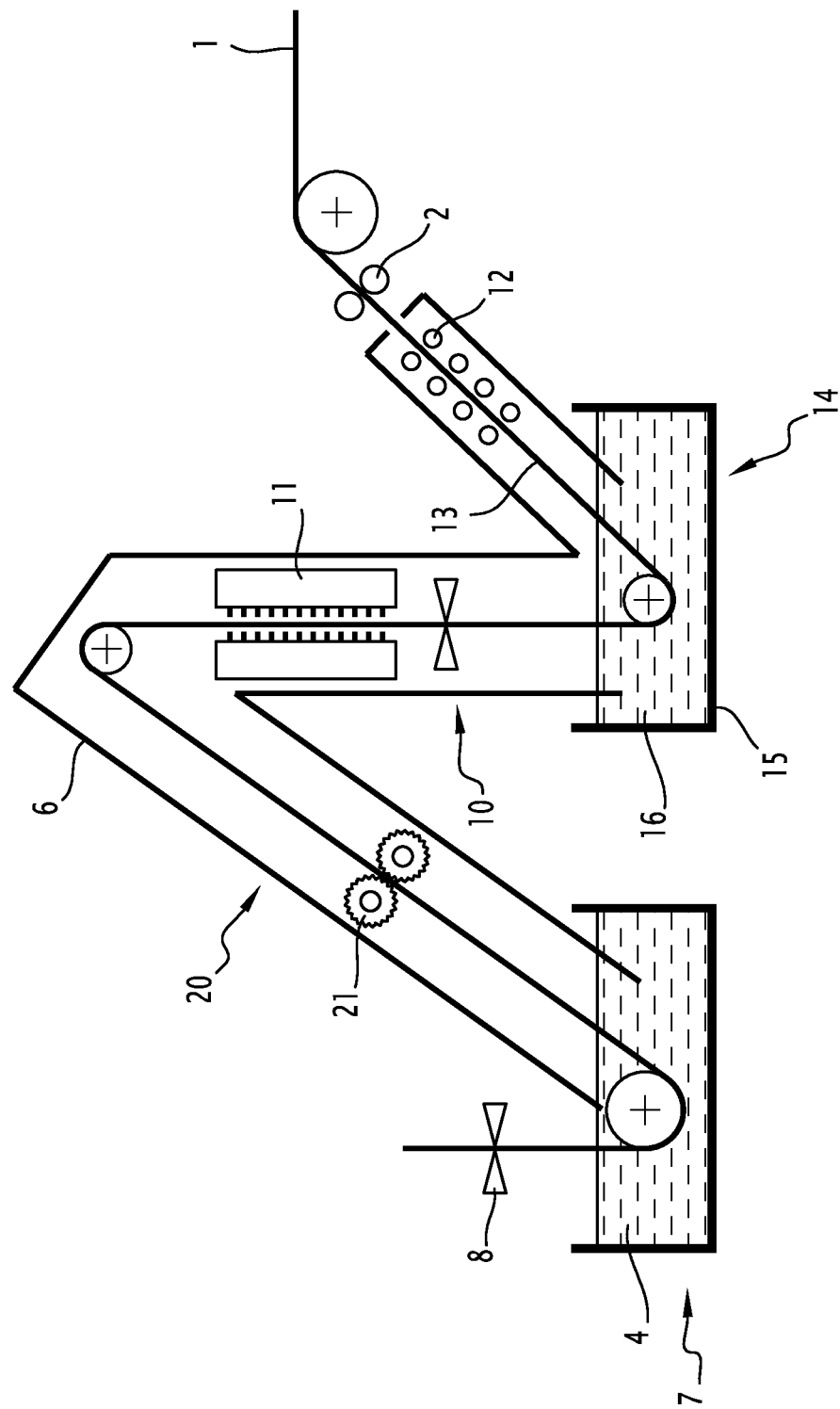
FIG. 2 is a schematic view of a continuous annealing line according to a second embodiment of the invention.

In a second embodiment of the invention, shown on FIG. 2, a cold rolled steel sheet 1 continuously runs through the different modules of the line by transport rolls 2. This cold rolled steel sheet 1 first runs through a heating module 12 which allows the strip to reach the recrystallization temperature of the steel. This heating module 12 can be an induction furnace as schematically shown, or any other known heating device.

The cold rolled steel sheet 1 then runs through a temperature holding zone 13, in which the temperature is kept constant for a sufficient time to allow recrystallization. The steel sheet 1, at a temperature TE' then runs through a cooling module 14. This cooling module is composed of a vessel 15 containing a bath 16 of molten oxides which are inert towards iron. The bath 16 has a viscosity η' lower than $3·10-1$ Pa·s, preferably lower than $2·10-2$ Pa·s, and has a temperature TB' lower than the temperature TE' of the steel sheet. The temperature of the bath TB' is, for example, set between 600° C. and 700° C. The bath 16 is kept at the temperature TB by cooling means required to eliminate the calories injected by the hot strip. This cooling means can be placed inside or outside of the bath, for example into another vessel containing some molten oxide maintained at the required temperature. The bath 16 is placed under a non-oxidizing atmosphere composed for example of N2 and H2 gases. The bath 16 is stirred by stirring means such as bubbling means or any other known stirring devices. The steel sheet 1 is immersed into the bath 16 and thanks to the specific viscosity η' of said bath 16 the steel sheet 1 is homogeneously cooled to a temperature TS' lower than TE' at the exit of the bath 16. The difference ΔT' between the temperature of the steel sheet 1 at the entrance of the bath TE' and the temperature of the bath TB' must be comprised between 25 and 900° C. for the same reasons exposed for the first embodiment of the invention.

After the cooling module the steel sheet 1 runs through a cleaning module 20 in which the residual molten oxides remaining on the steel sheet surfaces are eliminated. These residual molten oxides can be easily and quickly removed from the surfaces thanks to the specific viscosity η' of the bath 16, and this step does not slow down the production. Said cleaning module can include brushes 21, gas nozzles, or any other means which can remove the remaining molten oxides of the surfaces of the steel sheet 1.

If the temperature reached after the cleaning module 20 is not sufficiently low for the subsequent steps of production the steel sheet 1 can be immersed into an other bath (not represented) of molten oxides which are inert toward iron, said bath having, too, a viscosity lower than $3·10-1$ Pa·s, preferably lower than $2·10-2$ Pa·s, and having a temperature TB2 lower than the temperature of the steel sheet TS'.

As we have seen, the viscosity values for the molten oxides bath 16 or baths of this second embodiment are the same than for the first embodiment. This is logical, since the requirements of a low draining of molten glass on the sheet surface and of an easy removal of the glass remaining on the sheet 1 are identical. But since the temperature of the bath 16 is generally lower than in the first embodiment (it may be about 600-700° C., for example), the composition of the bath may have to be adapted to obtain this viscosity at this lower temperature. An example of such a composition is between 45% and 70% in weight of $B_2O_3$ (boundaries included, as for all following contents), between 30% and 55% in weight of $Li_2O$, and between 10% and 20% of $Na_2O$. $Na_2O$ can be partially or totally replaced by one or several of CaO, $K_2O$, $SiO_2$, $P_2O_5$, $MnO_2$. So the bath 16 can have a relatively high content in $Na_2O$ and/or functionally similar oxides, which ensures a lower melting temperature of the bath.

The bath components used as preferred examples for the first and second embodiments present the following characteristics.

$B_2O_3$ melts at a low temperature (460° C.), but its viscosity in the liquid state is very high. So, the bath viscosity has to be diminished by the addition of mainly $Li_2O$, and also of $Na_2O$ and/or other previously cited oxides.

$Li_2O$ is preferred, because this oxide is very stable and will never be reduced by any other alloying elements of the steel.

$Na_2O$ can also be used because of its strong impact on viscosity. However, it also strongly increases the hygroscopic nature of the solidified glass, which makes the material more difficult to handle. Also, $Na_2O$ is aggressive to the steel strip, and easily evaporates. So, it is not advised to massively use $Na_2O$ in baths which are set at relatively high temperatures, at which their viscosity is sufficiently low with no or or small amount of this component.

As made clear throughout the description, the thermal treatment process according to the invention can be used either to cool or heat a ferrous alloy sheet through the use of modules comprising crucibles containing molten oxide bathes. Such modules can be used on a classical manufacturing line as a replacement or in addition to the classical furnaces or cooling devices in place. Such modules are compact and can easily be implemented in an existing production line or, of course in a new production line.

What is claimed is:

1. A thermal treatment process for a ferrous alloy sheet comprising the steps of:
    performing a thermal treatment on a running ferrous alloy sheet by immersing the ferrous alloy sheet into at least one molten oxides bath, the molten oxides bath having a viscosity lower than $3 \cdot 10^{-1}$ Pa·s, a surface of the bath being in contact with a non-oxidizing atmosphere, the molten oxides being inert towards iron and a difference ($\Delta T$) between a temperature of the ferrous alloy sheet at an entry of the bath and a temperature of the bath being between 25° C. and 900° C.; and
    eliminating residues of molten oxides remaining on surfaces of the ferrous alloy sheet at an exit of the bath.

2. The thermal treatment process according to claim 1, wherein the temperature of the ferrous alloy sheet when the sheet enters the bath is lower than the temperature of the bath, resulting in a heating the ferrous alloy sheet.

3. The thermal treatment process according to claim 2, wherein the ferrous alloy sheet is pre-heated prior to immersion into the molten oxides bath.

4. The thermal treatment process according to claim 2, wherein the temperature of the molten oxides bath is within a range of 600° C. to 900° C.

5. The thermal treatment process according to claim 4, wherein the temperature of the molten oxides bath is from 700 to 850° C.

6. The thermal treatment process according to claim 1, wherein the ferrous alloy sheet is cooled after having been heated in the molten oxides bath.

7. The thermal treatment process according to claim 2, wherein the molten oxides bath initially comprises:
    45% w≤$B_2O_3$ ≤90% w;
    10% w≤$Li_2O$≤55% w; and
    0% w≤$Na_2O$≤10% w.

8. The thermal treatment process according to claim 7, wherein the $Na_2O$ is at least partially replaced by at least one of: CaO, $K_2O$, $SiO_2$, $P_2O_5$ or $MnO_2$.

9. The thermal treatment process according to claim 7, wherein the molten oxides bath initially comprises 45% w≤$B_2O_3$≤55% w and 40% w≤$LiO_2$≤50% w.

10. The thermal treatment process according to claim 1, wherein the temperature of the ferrous alloy sheet when the sheet enters the bath is higher than the temperature of the bath, resulting in a cooling of the ferrous alloy sheet.

11. The thermal treatment process according to claim 10, wherein the temperature of the molten oxides bath is from 600° C. to 700° C.

12. A thermal treatment process according to claim 10, wherein the molten oxides bath initially comprises:
    45% w≤$B_2O_3$≤70% w;
    30% w≤$Li_2O$≤55% w; and
    10% w≤$Na_2O$≤20% w.

13. The thermal treatment process according to claim 12, wherein $Na_2O$ is at least partially replaced by at least one of: CaO, $K_2O$, $SiO_2$, $P_2O_5$ or $MnO_2$.

14. The thermal treatment process according to claim 6, wherein the cooling step is performed using a process where the temperature of the ferrous alloy sheet when the sheet enters the bath is higher than the temperature of the bath, resulting in a cooling of the ferrous alloy sheet.

15. The thermal treatment process according to claim 1, wherein the ferrous alloy sheet is subjected to a coating step.

16. The thermal treatment process according to claim 1, wherein the ferrous alloy sheet is a steel sheet.

17. The thermal treatment process according to claim 1, wherein the molten oxides bath has a viscosity lower than $2 \cdot 10^{-1}$ Pa·s.

18. A device for implementing the thermal treatment process according to claim 1, comprising:
    a molten oxides bath having a viscosity lower than $3 \cdot 10^{-1}$Pa·s, a surface of the bath being in contact with a non-oxidizing atmosphere and the molten oxides being inert towards iron; and
    an elimination device for eliminating residues of molten oxides remaining on surfaces of the ferrous alloy sheet at an exit of the bath.

19. The device according to claim 18, comprising a heating module for preheating the ferrous alloy sheet located upstream the molten oxides bath.

20. The device according to claim 18, comprising a coating module for coating the ferrous alloy sheet located downstream the molten oxides bath.

21. The device according to claim 20, comprising a cooling module for cooling the ferrous alloy sheet located between the molten oxides bath and the coater.

22. The device according to claim 18, wherein said molten oxides bath has a viscosity lower than $2 \cdot 10^{-2}$Pa·s.

23. The device according to claim 19, wherein the heating module is an induction furnace.

24. The device according to claim 20, wherein the coating module is a bath.

* * * * *